United States Patent [19]

Saito et al.

[11] Patent Number: 5,657,078
[45] Date of Patent: Aug. 12, 1997

[54] SEMICONDUCTOR INTEGRATED CIRCUIT DEVICE FOR TELEVISION AND A TELEVISION RECEIVING SYSTEM USING THE SAME

[75] Inventors: Hitoshi Saito, Yokohama; Tadaharu Shimazu, Tokyo, both of Japan

[73] Assignee: Kabushiki Kaisha Toshiba, Kawasaki, Japan

[21] Appl. No.: 564,448

[22] Filed: Nov. 29, 1995

[30] Foreign Application Priority Data

Nov. 30, 1994 [JP] Japan .................................. 6-297263

[51] Int. Cl.⁶ .......................... H04N 17/00; H04N 17/04
[52] U.S. Cl. .......................... 348/180; 348/189; 348/192
[58] Field of Search .................................. 348/180, 184, 348/189, 192, 725, 673, 674, 678, 680; H04N 17/00, 17/04

[56] References Cited

U.S. PATENT DOCUMENTS

| | | | |
|---|---|---|---|
| 5,191,421 | 3/1993 | Hwang | 358/168 |
| 5,257,108 | 10/1993 | Muraoka | 358/164 |
| 5,267,024 | 11/1993 | Murayama | 348/725 |
| 5,311,317 | 5/1994 | Ogura et al. | 348/725 |
| 5,416,534 | 5/1995 | Hayashi et al. | 348/687 |
| 5,448,288 | 9/1995 | Oue et al. | 348/190 |
| 5,555,026 | 9/1996 | Lee | 348/565 |

FOREIGN PATENT DOCUMENTS 332293  11/1992  Japan ..................... H04N 17/04

*Primary Examiner*—Glenton B. Burgess
*Attorney, Agent, or Firm*—Oblon, Spivak, McClelland, Maier & Neustadt, P.C.

[57] ABSTRACT

An IC for generating various signals for television includes a switch circuit for selecting a signal to be monitored from the various signals and outputting the selected signal through an external terminal. A selection signal for selecting and outputting the signal to be monitored is supplied from a microcomputer to the IC. The microcomputer compares data contained in the signal selected and output from the IC with data which has been prepared in advance. Based on the comparison result, adjustment data used in generating a corresponding signal in the IC is renewed.

13 Claims, 3 Drawing Sheets

SEMICONDUCTOR INTEGRATED CIRCUIT DEVICE FOR TELEVISION AND A TELEVISION RECEIVING SYSTEM USING THE SAME

BACKGROUND OF THE INVENTION

1. Field of the Invention

The present invention relates to a semiconductor integrated circuit device for television, in which a picture intermediate frequency (PIF) processing circuit, a sound intermediate frequency (SIF) processing circuit, a video/chroma/deflection (VCD) processing circuit and the like are integrated on one chip, and also relates to a television receiving system using the semiconductor integrated circuit device.

2. Description of the Related Art

Recently, in the field of television receivers, the integration density of signal processing circuits has been increasing, which results in production of a type of semiconductor integrated circuit device for television, wherein a PIF circuit, a SIF circuit and a VCD circuit are all integrated on one chip.

Before manufacturers forward television receivers, they adjust various functions, such as PIF-VCO (voltage control oscillator), RF-AGC (automatic gain control), sub-contrast, sub-tint, sub-color and sub-brightness.

According to the conventional art, to conduct the adjustment before forwarding a television receiver, test points for the respective adjustment items are formed on a print circuit board. In the adjustment, status signals are output from the test points to the outside of the television receiver, monitored and controlled externally, and a control command is fed back to the television receiver.

For this reason, the conventional art has the following drawbacks. Since a test point is accessed by mechanical means in the adjustment, positioning control is required, resulting in a low reliability of electrical connection. In addition, since different access points are used for the respective contents of adjustment, the connection must be changed. Further, when the monitor and control outside the television receiver is performed manually, the reliability of the adjustment is lowered and considerable labor and time are required. If the adjustment is performed mechanically and automatically to overcome the above problems, an additional information process and control apparatus are required, resulting in a high cost.

As described above, since test points are provided on a print circuit board for the respective items of adjustment, the conventional art has the drawbacks, such as the low reliability of the adjustment or the high cost for the adjustment.

SUMMARY OF THE INVENTION

The present invention has been made in consideration of the above drawbacks of the conventional art. An object of the present invention is to provide a semiconductor integrated circuit device for television, which can be adjusted easily before forwarding, and by which the reliability of the adjustment can be improved and services after forwarding can be rationalized, and also to provide a television receiving system using the semiconductor integrated circuit.

According to an aspect of the present invention, there is provided a semiconductor integrated circuit device for television comprising:

a switch circuit, to which a plurality of signals are supplied, the switch circuit selecting and outputting a signal from the plurality of signals in accordance with a selection signal in a monitor mode; and an external terminal through which the signal selected by the switch circuit is output.

According another aspect of the present invention, there is provided a television receiving system comprising:

a tuner, connected to an antenna, for selecting a channel and outputting an IF (intermediate frequency) signal corresponding to the selected channel; and a semiconductor integrated circuit device for television, having a normal operation mode and a monitor mode, the device comprising:

an IF (intermediate frequency) circuit for generating an AFT (automatic fine tuning) control signal and an RF-AGC (automatic gain control) signal from the IF signal output from the tuner;

a Chroma signal generating circuit for generating B, G, and R signals from the IF signal;

a switch circuit, to which the AFT control signal, the RF-AGC signal and the B signal are supplied, the switch circuit selecting one signal from these signals in accordance with a selection signal in the monitor mode; and an external terminal through which the signal selected by the switch circuit is output.

According to still another aspect of the present invention, there is provided a television receiving system comprising:

a tuner, connected to an antenna, for selecting a channel and outputting an IF (intermediate frequency) signal corresponding to the selected channel; and a semiconductor integrated circuit device for television, having a normal operation mode and a monitor mode, for generating various signals for television based on the IF signal output from the tuner and selecting a signal to be externally monitored from the various signals and outputting the selected signal through a specific external terminal;

selection signal generating means for selecting and outputting the signal to be monitored through the external terminal of the semiconductor integrated circuit device for television;

adjustment data storing means for storing initial value data used in adjusting operations of generating the various signals in the semiconductor integrated circuit device for television;

data supply control means for supplying to the semiconductor integrated circuit device for television the initial value data stored in the adjustment data storing means as adjustment data for adjusting operations of generating the various signals;

data comparing means for comparing data contained in the signal output through the external terminal of the semiconductor integrated circuit device for television with data which has been prepared in advance;

adjustment data renewing means for renewing the adjustment data used to adjust the operations of generating various signals, when a specific relationship between the data compared by the data comparing means is not detected; and adjustment data storage controlling means for causing the adjustment data renewed by the adjustment data renewing means to be stored in the adjustment data storing means as adjustment data used in the normal operation mode.

According to a further aspect of the present invention, there is provided a television receiving system comprising:

a tuner, connected to an antenna, for selecting a channel and outputting an IF (intermediate frequency) signal corresponding to the selected channel;

a semiconductor integrated circuit device for television, having a normal operation mode and a monitor mode, for generating various signals for television based on the IF signal output from the tuner, selecting a signal to be externally monitored from the various signals based on a selection signal, and outputting the selected signal through a specific external terminal;

a remote control optical signal transmitter for transmitting, as an optical signal, instructions for selectively outputting the various signals for television to be monitored through the external terminal of the semiconductor integrated circuit device for television; and selection signal generating means for receiving the optical signal from the remote control optical signal transmitter, generating the selection signal for controlling a monitor signal selecting operation in the semiconductor integrated circuit device for television, and supplying the selection signal to the semiconductor integrated circuit device for television.

According to a still further aspect of the present invention, there is provided a television receiving system comprising:

a tuner, connected to an antenna, for selecting a channel and outputting an IF (intermediate frequency) signal corresponding to the selected channel; and a semiconductor integrated circuit device for television, having a normal operation mode and a monitor mode, for generating various signals for television based on the IF signal output from the tuner, the semiconductor integrated circuit device comprising:

signal generating means for generating the various signals for television;

signal selecting means for selecting a signal to be monitored from the various signals in the monitor mode;

selection signal generating means for generating a selection signal used in selecting a signal in the signal selecting means;

adjustment data storing means for storing initial value data used in adjusting operations of the signal generating means for generating the various signals;

data supply control means for supplying to the signal generating means the initial value data stored in the adjustment data storing means as adjustment data for adjusting operations of generating the various signals;

data comparing means for comparing data contained in the signal output from the signal selecting means with data which has been prepared in advance;

adjustment data renewing means for renewing the adjustment data used to adjust the operations of generating various signals, when a specific relationship between the data compared by the data comparing means is not detected;

adjustment data storage controlling means for causing the adjustment data renewed by the adjustment data renewing means to be stored in the adjustment data storing means as adjustment data used in the normal operation mode; and a remote control optical signal transmitter for transmitting, as an optical signal, instructions for generating the selection signal in the selection signal generating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
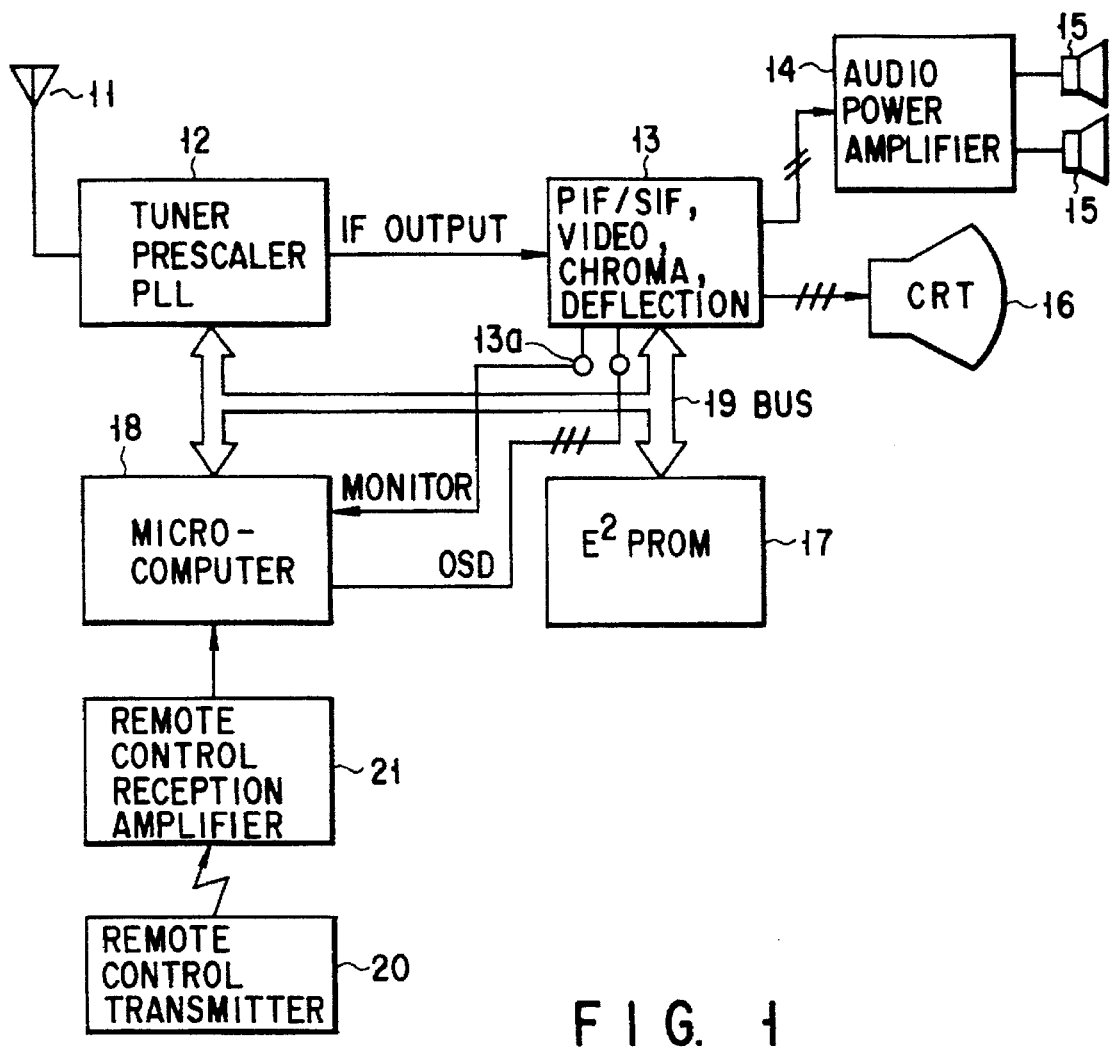
FIG. 1 is a block diagram showing the overall structure of a television receiving system according to a first embodiment of the present invention.

Embodiments of the present invention will be described with reference to the accompanying drawings. As shown in FIG. 1, a television receiver according to a first embodiment of the present invention comprises: an antenna 11, a tuner 12 connected to the antenna 11 and having prescaler and PLL functions, and a one-chip semiconductor integrated circuit device 13 for television (hereinafter referred to simply as an IC). The IC 13 has PIF, SIF, video, chroma and deflecting functions. It generates L- and R-channel audio signals, B, G, and R signals, and video signals, such as vertical and horizontal sync signals, based on an IF (intermediate frequency) signal supplied from the tuner 12. The television receiver of this embodiment also comprises; an audio power amplifier 14 for amplifying an audio signal generated by the IC 13; loud speakers 15 driven by outputs from the audio power amplifier 14; a CRT 16 for displaying an image in accordance with a video signal generated by the IC 13; an $E^2PROM$ 17 for storing adjustment data used in adjustment of operations of generating the above signals by the IC 13; a microcomputer 18 for controlling operations of the tuner 12, the IC 13 and the $E^2PROM$ 17; a bus 19 interconnecting the tuner 12, the IC 13, the $E^2PROM$ 17 and the microcomputer 18; an infrared remote control transmitter 20 for transmitting instructions for selecting a channel or adjusting sound volume or image in a normal operation mode, and various instructions in a monitor mode; and a remote control reception amplifier 21 which receives an optical signal from the remote control transmitter 20 and supplies the received signal to the microcomputer 18.

When a channel select instruction from the remote control transmitter 20 is input to the microcomputer 18, the tuner 12 selects a channel in accordance with the instruction from the microcomputer 18.

The IC 13 has a normal operation mode and a monitor mode. In the normal operation mode, the operations for generating the above signals in the IC 13 are controlled by using adjustment data prestored in the E²PROM 17 as initial value data. In the monitor mode, one of the signals generated by the IC 13 is output through an external terminal 13a based on a selection signal. The output signal is input to the microcomputer 18 as a monitor signal. The selection of the signal output from the external terminal 13a is executed on the basis of instructions from the remote control transmitter 20. In the normal operation mode, the IC 13 outputs an RF-AGC signal to the tuner 12, so that the amplitude of an output from the tuner 12 can be kept constant. It also generates an AFT control signal based on the difference between the frequency of an IF signal from the tuner 12 and a predetermined intermediate frequency, for example, 58.87 MHz, and supplies the AFT control signal to the microcomputer 18. The AFT control signal is supplied from the tuner 12, whereby the tuner 12 performs fine adjustment of selection of the channel.

The microcomputer 18 controls operations of the tuner 12, the IC 13 and the E²PROM 17 through the bus 19. The microcomputer 18 also has a so-called "on screen display" (OSD) function for displaying on the CRT 16 a control state of an operation based on the instructions from the remote control transmitter 20. A control signal for this function is supplied from the microcomputer 18 to the IC 13.

Figure 2:
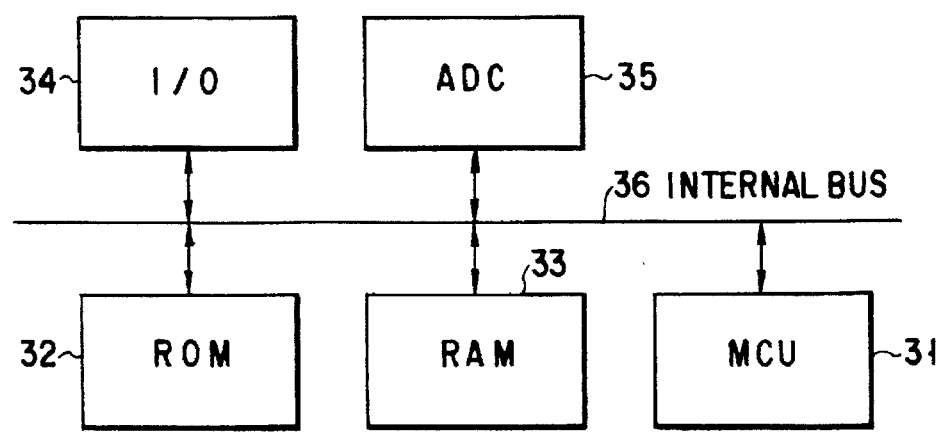
FIG. 2 is a block diagram showing the internal structure of the microcomputer shown in FIG. 1.

As shown in FIG. 2, the microcomputer 18 comprises a microcontroller unit (MCU) 31; a ROM 32 for storing control programs and control data for controlling the operations in the normal operation mode and the monitor mode; a RAM 33 for temporarily storing data; an input/output interface (I/O) 34; an analog-to-digital converter (ADC) 35; and an internal bus 36 interconnecting these elements.

Figure 3:
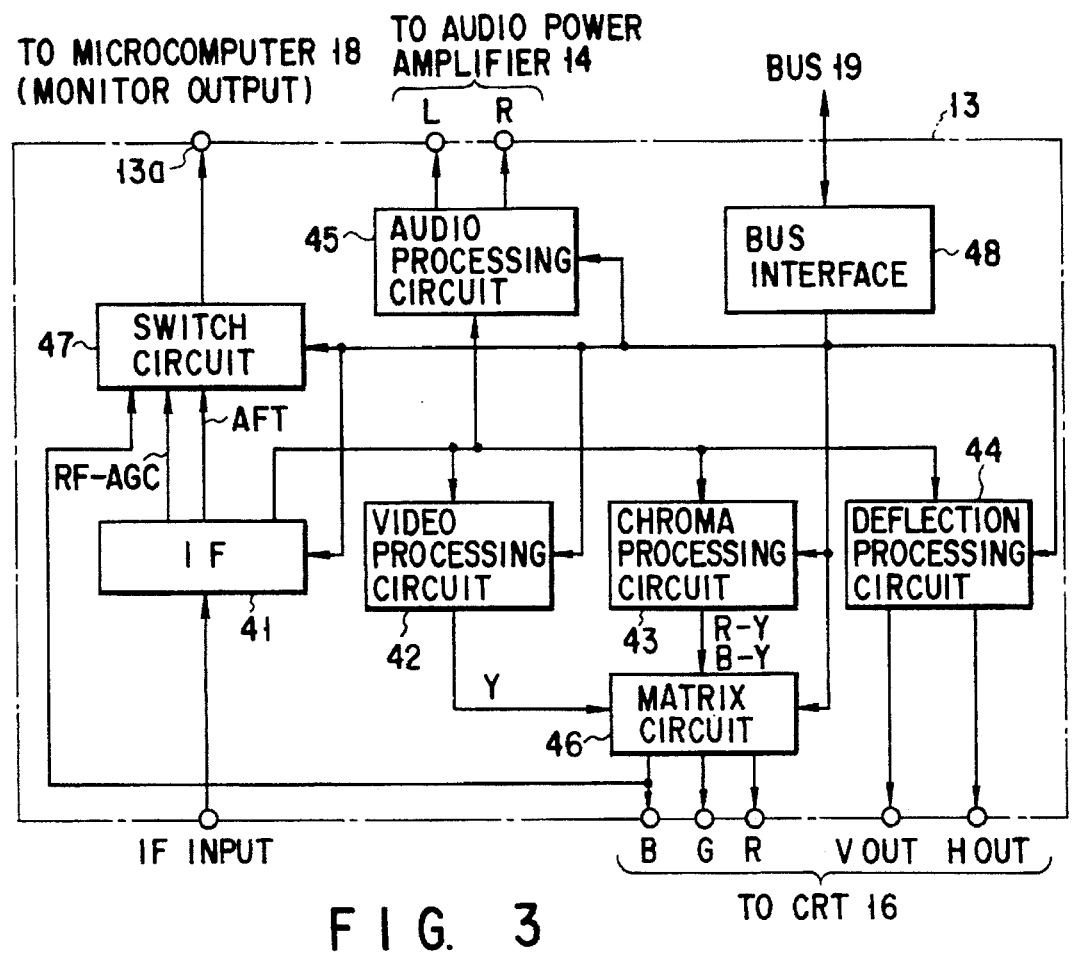
FIG. 3 is a block diagram showing the internal structure of the semiconductor integrated circuit device for processing an IF signal shown in FIG. 1.

FIG. 3 shows the internal structure of the IC 13, excluding the aforementioned OSD function circuit. An IF processing circuit 41 generates, based on the IF signal from the tuner 12, the AFT control signal, the RF-AGC signal and an IF output signal. The IF output signal is supplied to a video processing circuit 42, a chroma processing circuit 43, a deflection processing circuit 44 and an audio processing circuit 45. The video processing circuit 42 generates a luminance signal Y on the basis of the IF output signal from the IF processing circuit 41. The chroma processing circuit 43 generates chroma signals, including R-Y and B-Y signals (Y is a luminance signal component) based on the IF output signal from the IF processing circuit 41. The deflection processing circuit 44 generates a vertical sync signal $V_{out}$ and a horizontal sync signal $H_{out}$ based on the IF output signal from the IF processing circuit 41. The sync signals $V_{out}$ and $H_{out}$ are supplied to the CRT 16.

The R-Y and B-Y signals generated by the chroma processing circuit 43 are supplied to a matrix circuit 46. The matrix circuit 46 synthesizes B, G and R signals from the R-Y and B-Y signals and the luminance signal Y generated by the video processing circuit 42. The B, G and R signals are also supplied to the CRT 16. The B signal is supplied to a switch circuit 47 along with the AFT control signal and the RF-AGC signal. The switch circuit 47 selects one of the B signal, the AFT control signal and the RF-AGC signal input thereto. The signal selected by the switch circuit 47 is supplied to the microcomputer 18 through the external terminal 13a.

The audio processing circuit 45 generates an audio signal for the L- and R-channels based on the IF output signal from the IF processing circuit 41. The audio signal is supplied to the audio power amplifier 14.

The IC 13 also includes a bus interface 48 connected to the bus 19 shown in FIG. 1. The bus interface 48 receives data supplied through the bus 19, and controls the operations of the IF processing circuit 41, the video processing circuit 42, the chroma processing circuit 43, the deflection processing circuit 44, the audio processing circuit 45, the matrix circuit 46 and the switch circuit 47. The bus interface 48 also outputs data to the bus 19.

Figure 4:
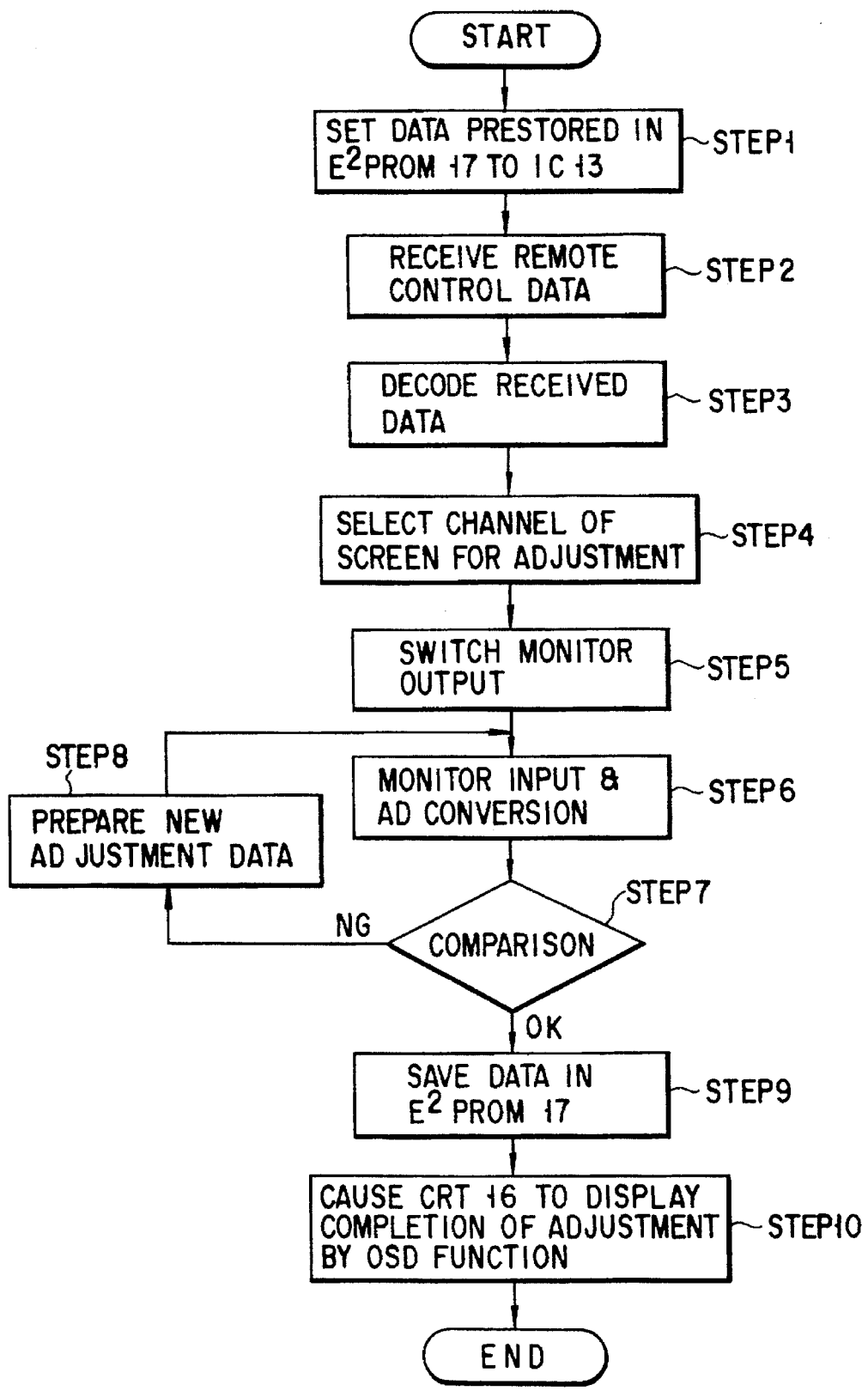
FIG. 4 is a flowchart showing an operation executed by the microcomputer shown in FIG. 1.

An operation with the above structure, in an adjustment operation before forwarding, will be described with reference to the flowchart shown in FIG. 4. First, immediately after the power is turned on, the adjustment data prestored in the E²PROM 17 are transmitted to the IC 13 (STEP 1). The adjustment data include data for determining DC levels of the AFT control signal and the RF-AGC signal in the IF processing circuit 41, and data for determining a mixing ratio of signals in the matrix circuit 46. These adjustment data are supplied to the relevant circuits. Thus, the signal generating operations of the internal circuit of the IC 13 are controlled by the adjustment data.

Next, to set the monitor mode, instructions are supplied from the remote control transmitter 20, by operating an operation button (not shown) provided, for example, on the remote control transmitter 20, in the order or state different from that in the normal operation mode. Assume that the remote control transmitter 20 transmits an instruction for selecting a fine adjustment mode in selecting a channel. In this case, when an optical signal from the remote control transmitter 20 is received by the remote control reception amplifier 21 (STEP 2), received data is decoded by the microcomputer 18 (STEP 3). In addition, the microcomputer 18 transmits channel selection data to the tuner 12 via the bus 19 in order to select the channel of the reference color image signal which is externally supplied to the antenna 11 for various adjustments. Based on the channel selection data, the tuner 12 performs a channel selection operation and receives the reference color image signal (STEP 4). Then, the microcomputer 18 sends to the IC 13 via the bus 19 a control command based on the received remote control data. The content of the control command is stored in the bus interface 48 within the IC 13. The switch circuit 47 selects and outputs, as a control command, the AFT control signal generated by the IF processing circuit 41 based on the command from the bus interface 48 (STEP 5). The monitor signal is input to the microcomputer 18 through the external terminal 13a.

In the microcomputer 18, first, the monitor signal is converted to digital data by the ADC 35 (STEP 6). The converted data is compared with data on the optimal value prestored in the ROM 32 and used as a reference value when the tuner 12 receives the reference color image signal (STEP 7). As a result of the comparison, if the data converted from the monitor signal does not coincide with the optimal value data or the difference between these data is beyond a certain range, adjustment data is renewed in the microcomputer 18 (STEP 8). The renewed adjustment data is supplied to the IF processing circuit 41 via the bus 19 and the bus interface 48 in the IC 13. Then, the monitor signal is input to the microcomputer 18 again, and converted to digital data, which is compared with the optimal value data. In STEP 7, if the comparison result is not satisfactory, the adjustment data is renewed again in the same manner as described above.

In STEP 7, if the comparison result is satisfactory, i.e., if the data converted from the monitor signal coincides with the optimal value data or the difference between these data is within the certain range, the newest one of the renewed adjustment data is supplied from the microcomputer 18 through the bus 19 to the E²PROM 17 and saved therein (STEP 9). Thereafter, by the OSD function, the microcomputer 18 causes the CRT 16 to display that the adjustment is completed (STEP 10).

When the adjustment of the operation of the IC 13 based on the one monitor signal output from the IC 13 is completed, a next signal is switched and output by the switch circuit 47 and monitored. The aforementioned adjustment is repeated a number of times as required. For example, when the B signal has been selected is monitor signal, adjustments of sub-contrast, sub-tint, sub-color, sub-brightness, etc. are performed.

As described above, according to this embodiment, the external terminal 13a for outputting a monitor signal is provided in the IC 13, so that one of a plurality of monitor signals is selected and output through the external terminal 13a. Thus, since the signal to be monitored is output only through the external terminal 13a, positioning control for mechanically accessing a test point for every item of the adjustment is unnecessary, unlike in the conventional art. Moreover, different adjustment items do not require different access points. In other words, it is only necessary that one external terminal 13a is connected to the access point. Thus, the access point need not be changed.

In the above embodiment, a signal to be monitored in the IC 13 is selected from the AFT control signal, the RF-AGC signal and the B signal. However, it is not limited to one of these signals but can be any other signal.

Further, in the above embodiment, the monitor signal output through the external terminal 13a is received by the microcomputer 18, so that the signal can be automatically monitored and adjusted in the television receiver. Thus, the adjustment can be performed within the television receiver before forwarding, without using any control device other than the television receiver. As a result, the adjustment cost is lowered and the adjustment reliability is increased. In addition, since the adjustment can be executed within in the television receiver, the services, after forwarding, can be rationalized.

Figure 5:
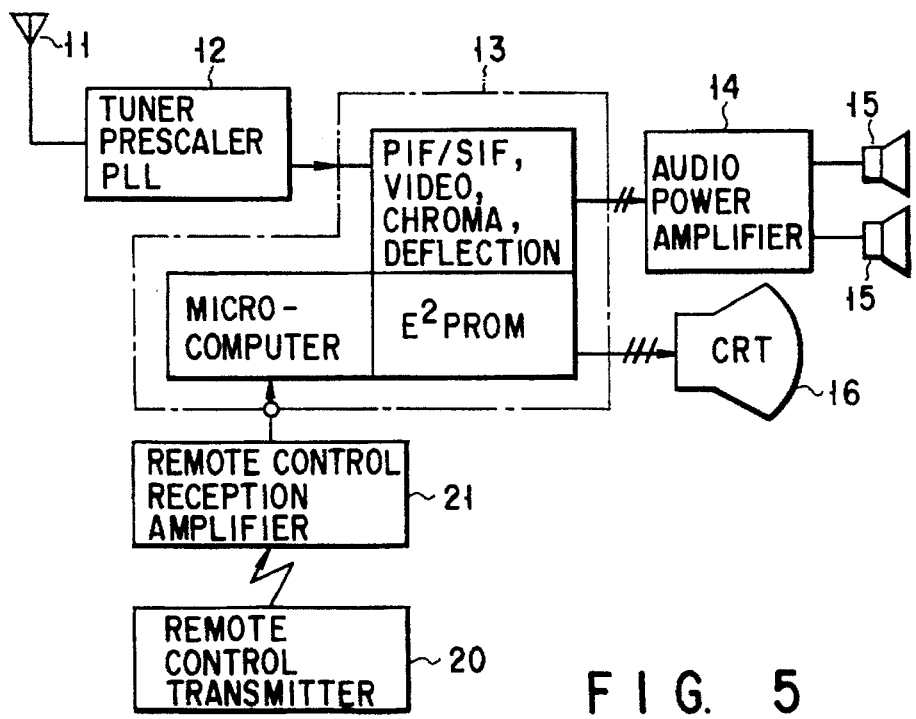
FIG. 5 is a block diagram showing the over all structure of a television receiving system according to a second embodiment of the present invention.

FIG. 5 shows a television receiver according to a second embodiment of the present invention. In this embodiment, the E$^2$PROM and the microcomputer are integrated on the same chip, i.e., the IC 13. In FIG. 5, the elements corresponding to those shown in FIG. 1 are identified with the same reference numerals as used in FIG. 1, and the descriptions thereof are omitted.

In the television receiver of the second embodiment shown in FIG. 5, the external terminal for outputting a monitor signal, as used in the first embodiment, is not required. An internal bus or an internal wire is used in place of the external terminal.

As has been described above, according to the present invention, it is possible to provide a semiconductor integrated circuit device for television, which can be adjusted easily before forwarding, and by which the reliability of the adjustment can be improved and services after forwarding can be rationalized, and it is also possible to provide a television receiving system using the semiconductor integrated circuit.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A television receiving system comprising:
   a tuner, connected to an antenna, for selecting a channel and outputting an IF (intermediate frequency) signal corresponding to the selected channel; and
   a semiconductor integrated circuit device for television, having a normal operation mode and a monitor mode, the device comprising:
   an IF (intermediate frequency) circuit for generating an AFT (automatic fine tuning) control signal and an RF-AGC (automatic gain control) signal from the IF signal output from the tuner;
   a chroma signal generating circuit for generating B, G, and R signals from the IF signal;
   a switch circuit, to which the AFT control signal, the RF-AGC signal and the B signal are supplied, the switch circuit selecting one signal from these signals in accordance with a selection signal in the monitor mode; and
   an external terminal through which the signal selected by the switch circuit is output.

2. The television receiving system according to claim 1, wherein the switch circuit selects and outputs the AFT control signal from the signals supplied thereto in the normal operation mode.

3. A television receiving system comprising:
   a tuner, connected to an antenna, for selecting a channel and outputting an IF (intermediate frequency) signal corresponding to the selected channel; and
   a semiconductor integrated circuit device for television, having a normal operation mode and a monitor mode, for generating various signals for television based on the IF signal output from the tuner and selecting a signal to be externally monitored from the various signals and outputting the selected signal through a specific external terminal;
   selection signal generating means for selecting and outputting the signal to be monitored through the external terminal of the semiconductor integrated circuit device for television;
   adjustment data storing means for storing initial value data used in adjusting operations of generating the various signals in the semiconductor integrated circuit device for television;
   data supply control means for supplying to the semiconductor integrated circuit device for television the initial value data stored in the adjustment data storing means as adjustment data for adjusting operations of generating the various signals;
   data comparing means for comparing data contained in the signal output through the external terminal of the semiconductor integrated circuit device for television with data which has been prepared in advance;
   adjustment data renewing means for renewing the adjustment data used to adjust the operations of generating various signals, when a specific relationship between the data compared by the data comparing means is not detected; and
   adjustment data storage controlling means for causing the adjustment data renewed by the adjustment data renewing means to be stored in the adjustment data storing means as adjustment data used in the normal operation mode.

4. The television receiving system according to claim 3, wherein the semiconductor integrated circuit device for television comprises:

an IF (intermediate frequency) circuit for generating an AFT (automatic fine tuning) control signal and an RF-AGC (automatic gain control) signal from the IF signal output from the tuner;

a chroma signal generating circuit for generating B, G, and R signals from the IF signal;

a switch circuit, to which the AFT control signal, the RF-AGC signal and the B signal are supplied, the switch circuit selecting one signal from these signals in accordance with a selection signal in the monitor mode; and an external terminal through which the signal selected by the switch circuit is output.

5. The television receiving system according to claim 3, wherein the selection signal generating means comprises:

a remote control optical signal transmitter for transmitting, as an optical signal, instructions for selectively outputting the various signals for television to be monitored through the external terminal of the semiconductor integrated circuit device for television; and signal generating means for generating the selection signal upon reception of the optical signal from the remote control optical signal transmitter, and supplying the selection signal to the semiconductor integrated circuit device for television.

6. The television receiving system according to claim 4, wherein the switch circuit selects and outputs the AFT control signal in the normal operation mode.

7. The television receiving system according to claim 5, wherein the remote control optical signal transmitter transmits, as an optical signal, instructions for selecting a channel in the tuner.

8. A television receiving system comprising:

a tuner, connected to an antenna, for selecting a channel and outputting an IF (intermediate frequency) signal corresponding to the selected channel;

a semiconductor integrated circuit device for television, having a normal operation mode and a monitor mode, for generating a plurality of signals for use in adjustment of various functions of the television based on the IF signal output from the tuner, selecting a signal to be externally monitored from the various signals based on a selection signal, and outputting the selected signal through a specific external terminal;

a remote control optical signal transmitter for transmitting, as an optical signal, instructions for selectively outputting the plurality of signals for use in adjustment of various functions of the television to be monitored through the external terminal of the semiconductor integrated circuit device for television; and selection signal generating means for receiving the optical signal from the remote control optical signal transmitter, generating the selection signal for controlling a monitor signal selecting operation in the semiconductor integrated circuit device for television, and supplying the selection signal to the semiconductor integrated circuit device for television.

9. The television receiving system according to claim 8, wherein the selection signal generating means includes a microcontroller unit for controlling a channel selecting operation in the tuner.

10. The television receiving system according to claim 9, wherein the remote control optical signal transmitter transmits, as an optical signal, instructions for selecting a channel in the tuner.

11. A television receiving system comprising:

a tuner, connected to an antenna, for selecting a channel and outputting an IF (intermediate frequency) signal corresponding to the selected channel; and a semiconductor integrated circuit device for television, having a normal operation mode and a monitor mode, for generating various signals for television based on the IF signal output from the tuner, the semiconductor integrated circuit device comprising:

signal generating means for generating the various signals for television;

signal selecting means for selecting a signal to be monitored from the various signals in the monitor mode;

selection signal generating means for generating a selection signal used in selecting a signal in the signal selecting means;

adjustment data storing means for storing initial value data used in adjusting operations of the signal generating means for generating the various signals;

data supply control means for supplying to the signal generating means the initial value data stored in the adjustment data storing means as adjustment data for adjusting operations of generating the various signals;

data comparing means for comparing data contained in the signal output from the signal selecting means with data which has been prepared in advance;

adjustment data renewing means for renewing the adjustment data used to adjust the operations of generating various signals, when a specific relationship between the data compared by the data comparing means is not detected;

adjustment data storage controlling means for causing the adjustment data renewed by the adjustment data renewing means to be stored in the adjustment data storing means as adjustment data used in the normal operation mode; and a remote control optical signal transmitter for transmitting, as an optical signal, instructions for generating the selection signal in the selection signal generating means.

12. A television receiving system comprising:

signal generating means for generating various signals for television on the basis of a received signal selected by a tuner;

selective output means for selectively outputting the various signals to be monitored, which have been generated by the signal generating means in a monitor mode;

first storage means for storing reference data of the various signals which are to be generated by the signal generating means and to be monitored, when a monitor mode reference signal has been received by the tuner;

comparing means for comparing the signal selectively output from the selective output means in the monitor mode, with the reference data stored in the first storage means and associated with the selectively output signal;

data generating means for generating various adjustment data for adjusting the signal generating means, on the basis of a comparison result of the comparing means, such that the selectively output signal coincides with the associated reference data; and second storage means for storing the generated various adjustment data, wherein the signal generating means is adjusted on the basis of the various adjustment data stored in the second storage means, thereby generating the various signals for the television.

13. A semiconductor integrated circuit device for television, having a normal operation mode and a monitor mode, the device comprising:

an IF (intermediate frequency) circuit for receiving an IF (intermediate frequency) signal, and generating an AFT (automatic fine tuning) control signal and an RF-AGC (automatic gain control) signal from the IF signal;

a video processing unit for receiving the IF signal, and generating a luminance signal from the IF signal;

a chroma processing circuit for receiving the IF signal, and generating chroma signals from the IF signal;

a matrix circuit for receiving the chroma signals generated by the chroma processing circuit, and generating B, G and R signals from the chroma signals;

a switch circuit for receiving the AFT control signal, the RF-AGC signal and the B signal, and selecting one of the AFT control signal, the RF-AGC signal and the B signal in accordance with a selection signal in the monitor mode; and an external terminal for allowing said one of the AFT control signal, the RF-AGC signal and the B signal to be output through the external terminal.

* * * * *